United States Patent [19]

Kraus

[11] Patent Number: 5,033,701
[45] Date of Patent: Jul. 23, 1991

[54] PLASTIC HOLDER ELEMENT

[75] Inventor: Willibald Kraus, Grunstadt, Fed. Rep. of Germany

[73] Assignee: TRW United Carr GmbH & Co., Alsenborn, Fed. Rep. of Germany

[21] Appl. No.: 470,125

[22] Filed: Jan. 25, 1990

[30] Foreign Application Priority Data

Jan. 27, 1989 [DE] Fed. Rep. of Germany ....... 3902499

[51] Int. Cl.⁵ .............................................. F16L 3/12
[52] U.S. Cl. ................... 248/68.1; 248/71; 248/74.1
[58] Field of Search .......... 248/68.1, 71, 73, 74.1–74.5

[56] References Cited

U.S. PATENT DOCUMENTS

| | | | |
|---|---|---|---|
| 3,592,427 | 7/1971 | Misuraca | 248/68.1 |
| 3,894,706 | 7/1975 | Mizusawa | 248/68.1 |
| 4,541,602 | 9/1985 | Potzas | 248/68.1 X |
| 4,550,891 | 11/1985 | Schaty | 248/68.1 |
| 4,564,163 | 1/1986 | Barnett | 248/71 |
| 4,655,423 | 4/1987 | Schavilje et al. | 248/547 X |
| 4,840,333 | 6/1989 | Nakayama | 248/73 X |
| 4,881,705 | 11/1989 | Kraus | 248/74.2 |

FOREIGN PATENT DOCUMENTS 310777 5/1969 Sweden .............................. 248/68.1

Primary Examiner—Alvin C. Chin-Shue
Attorney, Agent, or Firm—Fay, Sharpe, Beall, Fagan, Minnich & McKee

[57] ABSTRACT

A holding device of plastic and particularly suited for mounting tubular elements to a support comprises a lower part 4 intended to be fastened to the support 2; an intermediate part 5, fitted into the lower part; and an upper part 6, locked by resilient catches with the lower part 4. The lower part 4 and the upper part 6 are formed of hard material while the intermediate part 5 is formed of softer and more resilient material. The holding device 1 has at least one bearing zone for the reception of a tubular element 9, 10. According to the invention, the bearing zone 7, 8 is arranged in the intermediate part 5, and, in the mounted condition, the intermediate part surrounds the tubular element 9, 10, over almost its entire circumference to prevent contact between the tubular elements and the harder material of the lower part 4 and the upper part 6.

12 Claims, 2 Drawing Sheets

PLASTIC HOLDER ELEMENT

BACKGROUND OF THE INVENTION

The subject invention relates to a plastic holding device having a lower part adapted to be fastened to a support, an intermediate part set therein, and an upper part locked by catch elements with the lower part. The lower part and the upper part are formed from a relatively hard material while the intermediate part is formed from a relatively softer material. At least one bearing or gripping point for the reception of a tubular element to be held is provided on the device.

Already known in the art, is a holding device in which the lower part has several zones separated from each other by ribs or stays and into which wires are laid. (See U.S. Pat. No. 4,347,998). In this known device, the softer middle part is correspondingly provided with openings and strikes against the wires from above and presses them against the lower part. The whole arrangement is closed by an upper part also formed of harder material. The upper part has a hook form and engages in ridges on both sides of the lower part. The assembled unit is fastened through several screws to the associated support.

The resulting construction as described above is not sufficiently noise-damped because of the direct support of the tubular parts in the individual sections of the harder material lower part. Moreover, the individual parts of the holding device are connected together in a manner such that, with larger loads, they could come loose from each other.

Also known in the state of the art is a two-part holding device with a plastic lower part for receiving two pipes and which has its upper zone closed by a bracket-like upper part formed of sheet metal. (See British Patent 1 403 714). Here also, no noise-damping is provided.

Contrary to the above, the present invention attacks the problem of designing a holding element of the kind mentioned, so that, in a simple but effective way, very good noise-damping is provided.

BRIEF STATEMENT OF THE INVENTION

The problem of providing a holding element with sufficient holding effect and effective noise-damping is solved, according to the invention, by the fact that the bearing or gripping zone of this invention is arranged in the intermediate part of softer material such that in the mounted condition of the tubular element, the intermediate part almost completely surrounds the whole circumference of the tubular element. In this way, effective noise-damping is provided, since the noise-producing zones of the tubular part are supported in an embedded manner in the intermediate part of relatively softer material, and, in no way, come in contact with the relatively harder material of the lower or upper parts.

In a further development of the invention, the intermediate part is joined with the lower part through at least one catch element. Preferably, the lower part has two openings which are opposite one another, and the intermediate part has two catch projections which may be set into the opposed openings. In this way, a form-fitting connection is provided between the intermediate part and lower part so that even under high loads a good connection is assured.

According to another feature of the invention, the lower part has another opening above the latch projection openings so that the intermediate part, as well as the upper part, may be fastened to the lower part through suitable catch elements.

According to another feature of the invention, the bearing or gripping zone of the intermediate element may have openings or recesses passing completely through or divided by intermediate walls. Moreover, the bearing or gripping zone of the intermediate element has, in each case, a tongue which acts to cover the tubular part when it is in the mounted condition. These tongues can also be provided with through openings or recesses. The through openings or recesses of the tongues, in combination with the recesses in the bearing zone, provide a high degree of resiliency is obtained. This results in further improvement in the noise damping provided to the tubular parts.

According to another feature of the invention, if several tubular parts must be supported, the intermediate element has at least one of the bearing or holding zones located on each side of a middle zone which carries the catch projections and the cylindrical opening. In such case, the bearing or holding zones may have different diameters so as to be able to support pipes of different diameters.

In further development of the invention, the lower part may be U-shaped in cross section with a bottom and two parallel end walls with openings in the zone of the bearing zones of the intermediate part. With this arrangement, the intermediate part can be supported in the U-shaped configuration of the lower part and connected with the lower part through the catch elements. To facilitate premounting, the openings of the lower part may be provided with lead-in slopes on the entry side of the openings and bevels on the underside. This allows the tubular parts to be pushed easily into the bearing zones. While in this premounted condition, the biasing action of the intermediate part of the relatively softer material presses the tubular parts against the bevels and holds them there in the premounted condition.

According to another feature of the invention, the middle zone of the bottom of the lower part may have at least one catch element for connection to a fastening element arranged on the support. The catch element may consist of at least two oppositely positioned springy tongues provided with stepped graduations. These resilient tongues can engage, for example, in threaded zones of the fastening elements provided on the support, and thus permit a premounting of the assembly before final setting of the upper part.

In order to hold more pipelines, according to the invention, it is possible in each case for the lower part to have, in addition to the bearing points formed by the intermediate element, at least one other bearing zone.

According to another feature of the invention, the upper part can comprise a plate and two opposed side walls corresponding to the bearing zones of the intermediate part.

In the side walls the catch projections are arranged for engaging in the openings of the lower part. Moreover, the middle zone of the upper part may have a bolt-like member provided with a blind hole, and connected to the plate by a frangible membrane. After mounting, the bolt-like member is embedded in the cylindrical opening of the intermediate part. This produces an effective locking together of the three parts, namely the lower part, the intermediate part and the upper part, in the mounted condition.

Moreover, in the mounted condition the front zone of the bolt-like member may strike against the outer circumference of the tongue of the lower part to press against the fastening element of the support. By this there is attained a considerable improvement of the holding effect of the whole unit on the support. To permit a demounting, the bolt-like member may have a head with a tool slot or the like, and a blind hole provided with threads or profiling, so that by turning the bolt, the unit may be loosened from the threaded fastening element of the support.

BRIEF DESCRIPTION OF THE DRAWINGS

The invention will be described in detail below, with reference to a preferred embodiment represented in the accompanying drawings wherein.

DETAILED DESCRIPTION OF THE PREFERRED EMBODIMENT

Figure 5:
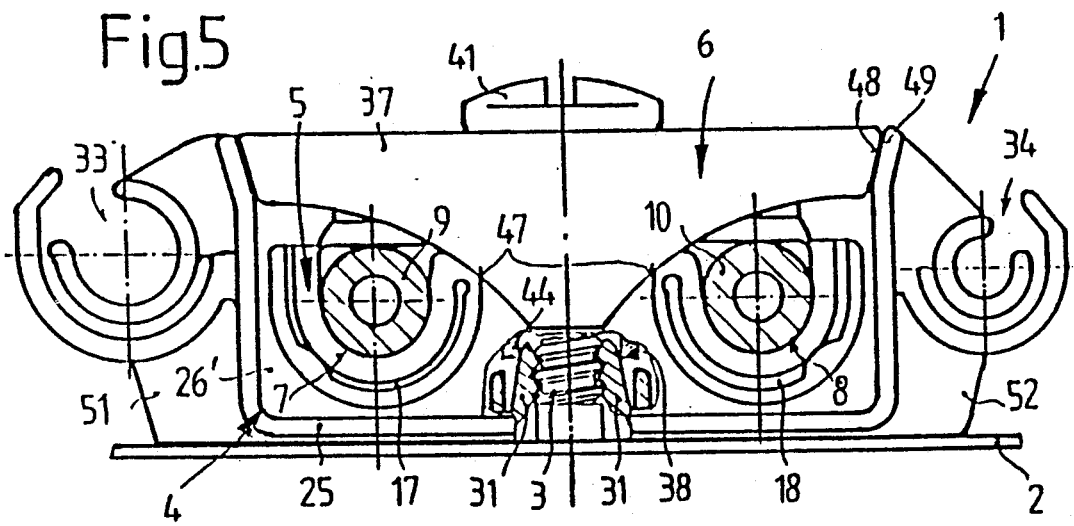
FIG. 5 shows the whole device including the upper part, the lower part and the intermediate part in assembled mounted condition with two tubular parts carried in the holding zone; and, FIG. 6 is a top view of the completely assembled and mounted unit according to FIG. 5.

Referring more particularly to the drawings, the holding device 1 according to the invention is shown in the mounted condition in FIG. 5. As illustrated therein, the device is connected to a support 2 through a profiled or threaded stud or similar fastening element 3 joined to the support by welding or the like. The device 1 is comprised generally of a lower part 4, an intermediate part 5 and an upper part 6. Here, the lower part 4 and the upper part 6 are formed of a relatively harder and somewhat more rigid material and the intermediate part 5 is formed of a relatively softer and more resilient plastic material. Through use of the completely assembled holding device shown in FIG. 5, tubular elements 9 and 10 can be supported in a noise and vibration damped condition. Moreover, it is possible to hold other tubular elements, correspondingly, in bearing points 33 and 34 which comprise, in each case, two cooperating shell-like holding elements of known design.

Figure 1:
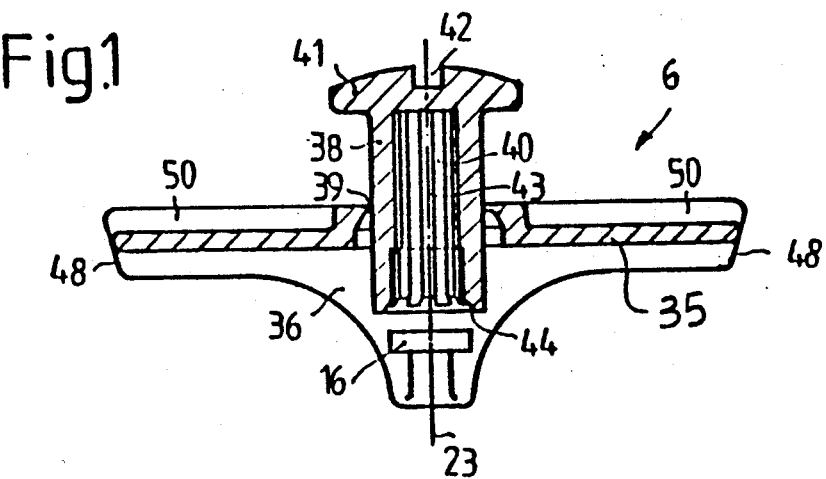
FIG. 1 is a sectional elevation of an upper part.
Figure 2:
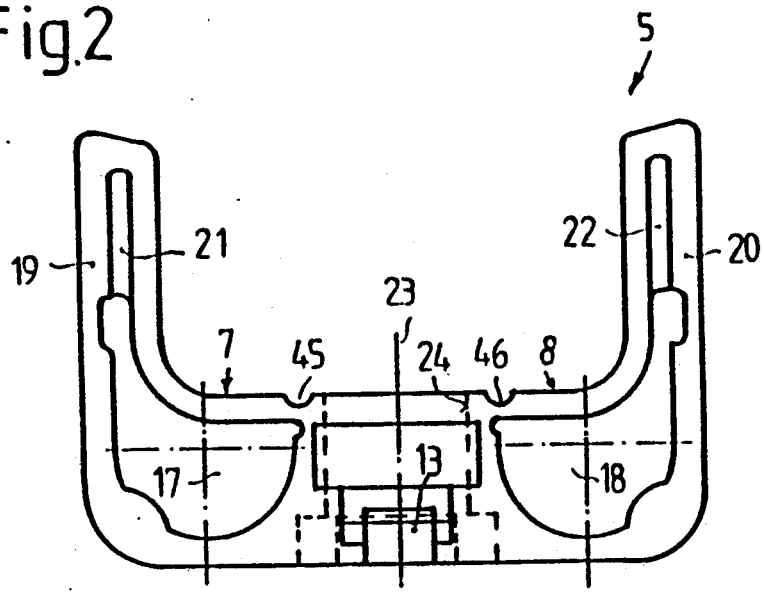
FIG. 2 is a side elevational view of an intermediate part.
Figure 3:
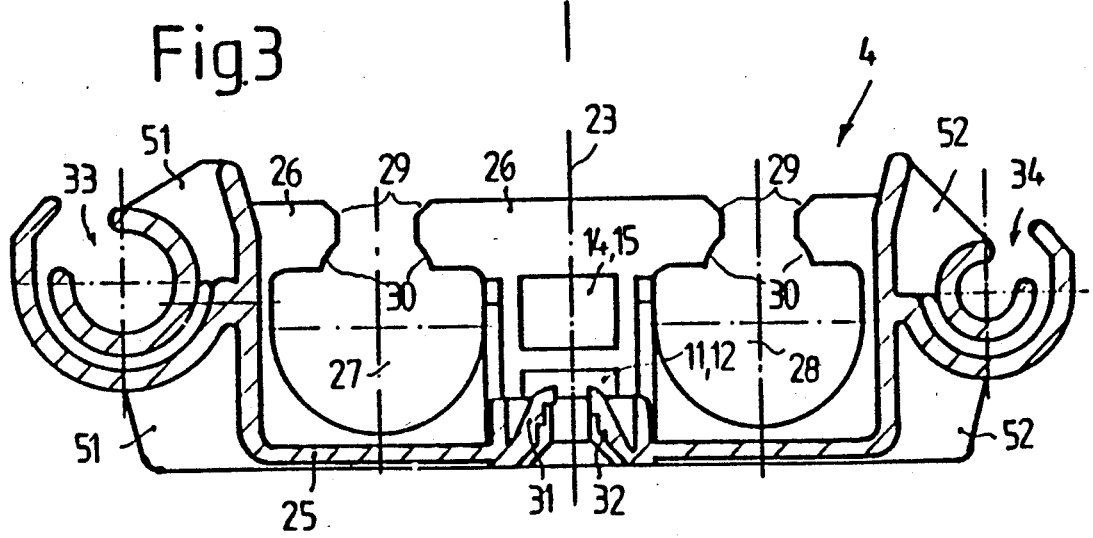
FIG. 3 is a sectional elevation of a lower part.

FIGS. 1, 2 and 3 show in detail the preferred construction of three individual parts of the holding device according to the invention. Here, according to FIG. 1, the upper part 6 consists of a plate 35, and two opposed depending side walls 36 and 37 (See FIG. 5). In the two side walls are arranged inwardly extending catch projections 16. Moreover, the middle zone 23 of upper part 6 has a bolt-like member 38 provided with a blind hole 40. Member 38 is joined through a frangible membrane 39 with the plate 35. Here, the blind hole 40 may be provided with suitable internal ribs or threads 43, and with a head 41 with a tool engaging slot 42. The ends of the plate 35 and the side walls 36 and 37 are defined by bevels 48. In each case, the two side walls have in the zone of the plate 35 a parallel running ridge 50. The front end of the blind hole 40 has a conical lead-in zone 44 to facilitate installation on a threaded stud 3 as shown in FIG. 5.

In FIG. 2, the intermediate part, formed of a relatively softer and more resilient plastic material is shown in detail. As can be seen, bearing or tube holding zones 7 and 8 are present on both sides of a middle zone 23 below which are openings 17 and 18. The bearing zones 7 and 8 pass into tongues 19 and 20, which also have openings or recesses 21 and 22, which may be divided, for example, by intermediate walls. In the bearing zones 7 and 8, there may be two lengthwise running grooves 45 and 46. The openings 17 and 18 together with the grooves 45 and 46 provide a degree of flexibility and resilience to the bearing or holding zones 7 and 8, the importance of which will subsequently become apparent.

In the middle zone 23, the intermediate part 5 has oppositely disposed catch projections 13. Also provided in the middle zone is a cylindrical through opening 24. This cylindrical through opening 24 passes, in the lower zone of the intermediate part 5, into a larger cylindrical opening or counterbore entry section.

Figure 4:
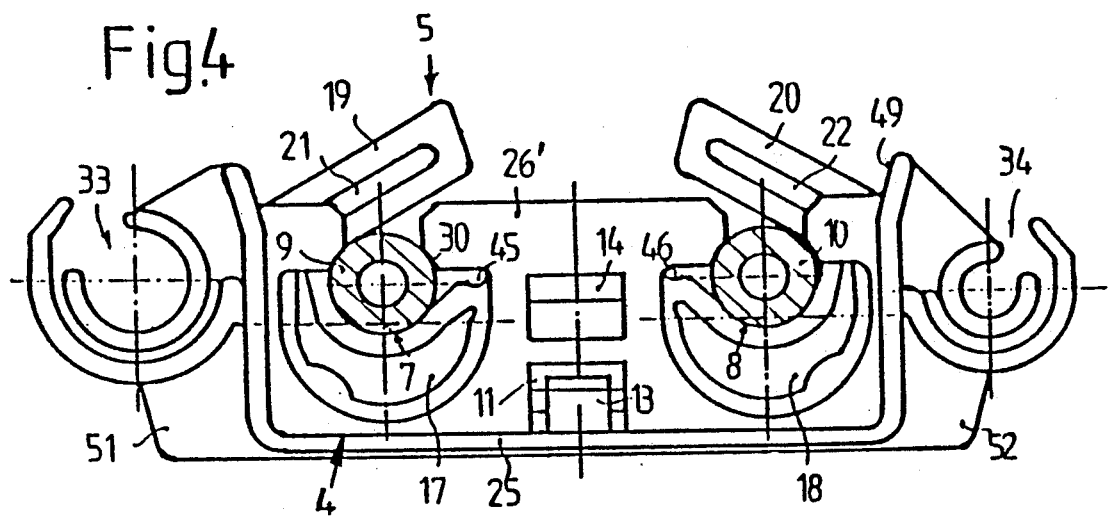
FIG. 4 illustrates in side elevation the intermediate part according to FIG. 2 and the lower part according to FIG. 3, in an assembled premounted condition with two tubular parts carried in the holding zones.

The lower part 4 is shown in detail in FIG. 3. As can be seen, it is designed with a U-shape having a bottom wall 25 and two side walls 26 and 26' (See FIG. 5). As seen in FIG. 4, the side walls 26 and 26' lie opposite each other and run parallel. In each case, the two side walls 26 and 26' are provided with openings 27 and 28 corresponding to bearing zones 7 and 8 of the intermediate part 5. Above the two openings 27 and 28 are lead-in chambers or slopes 29 or bevels 30 to facilitate the entry and pre-mounting for the tubular elements 9 and 10.

In the middle zone 23, the lower part 4 is provided with two openings 11 and 12 which lie opposite each other. The openings 14 and 15 are used for receiving and engaging the catch projections 16 in the side walls 36 and 37 of the upper part 6; whereas, the openings 11 and 12 located below them are used for receiving and engaging the catch projections 13 arranged in the intermediate part 5. Moreover, the middle zone in the area adjoining the bottom wall 25 is equipped with an upwardly extending flange ring which is received into the corresponding counterbore opening of the intermediate part 5. Situated in the zone of the ring are at least two oppositely disposed resilient fingers 31 with stepped graduations or teeth 32 which serve as catch elements for connection to the threaded stud 3 in a known manner.

As already explained, the lower part 4 may be provided with other bearing or holding points 33 and 34, which are formed on the U-shaped part and stabilized by central stays or outwardly extending walls 51 and 52.

FIG. 4 shows in detail the preliminary premounting in which the lower part 4 is assembled with the intermediate part 5. As can be seen, two tubular elements 9 and 10 have been placed in the bearing zones 7 and 8. The tubular elements 9 and 10 are supported against the bevels 30 of the openings 27 and 28, and are pressed or biased against the latter by the resilient effect of the bearing zones 7 and 8 lying above the openings 17 and 18 of the relatively softer intermediate part 5. Here, the tongues 19 and 20 have been laid partly over the circumference of the tubular elements 9 and 10. In this condition, the premounted unit is comprised of lower part 4 and intermediate part 5 which is connected by its oppositely disposed catch projections 13 entering into the corresponding openings 11 and 12 in the middle zone 23 of the side walls 26 and 26' of the lower part 4.

This premounted unit, according to FIG. 4, can now be pressed onto a profiled fastening element or threaded stud 3 joined for example, to a support 2. The resilient fingers 31 by virtue of their graduations or teeth 32 engage against the outer circumference of the profiled fastening element or threaded stud 3 as shown in FIG. 5.

After this further stage of premounting, the upper part 6 is brought into alignment from above and set onto the intermediate part 5 and the lower part 4. With this, the catch projections 16 located in the side walls 36 and 37 of the upper part 6 enter into the corresponding opening 14 and 15 in the middle zone 23 of the side walls 26 and 26' of the lower part 4. This locks the components in the preliminary assembled condition.

After this locking, a blow is applied to the head 41 of the bolt-like member 38 in the upper part 6. This causes the fastening element 3 to be embedded in the blind hole 40 of the bolt-like member 38. After carrying out this mounting, and as can be seen from FIG. 5, the conical lead-in zone 44 of the bolt-like member 38 is fitted over the upper part of the resilient fingers 31. This action presses the fingers 31 against the profile of the fastening element 3 to maintain the elements positively engaged.

With this is given a final mounting, as shown in FIG. 5. The tubular elements 9 and 10 are supported in the bearing zones 7 and 8 which are formed by the relatively softer intermediate part. The tubular elements 9 and 10 are almost completely surrounded by the relatively softer material of the intermediate element 5 and the bearing zones 7 and 8. Thus, very good noise damping is provided, because they do not come in contract with the relatively harder material of upper part 6 or the lower part 4. Here, as shown, the side walls 36 and 37 of the upper part 6 are, in each case, preferably designed with a curved form 47 in order not to come in contact with a corresponding zone of the tubular element 9 or 10.

Through the contact of the conical lead-in zone 44 of the blind hole 40 in the bolt-like member 38, the resilient fingers 31 and teeth 32 are strongly pressed against the profiling of the fastening element 3. Consequently, the entire unit is fastened in its assembled entirety in a functionally secure manner to the support 2.

As an alternative, it is possible also to premount the lower part 4 with intermediate element 5 on a downwardly directed support for example, and then to press in pipelines which are supported in the bearing zones 7 and 8 and are held in this position by the bevels 30 (See FIG. 3) until the final mounting.

Figure 6:
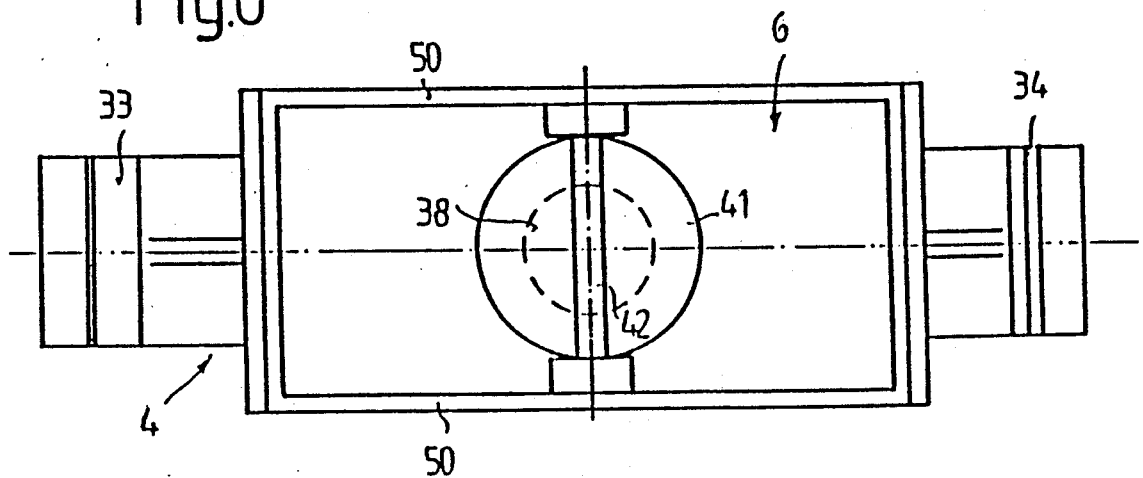

According to FIGS. 5 and 6, it is now possible to demount the assembly by inserting a tool, a screwdriver for example, into the tool slot 42 of the head 41 of the bolt-like member 38. An unscrewing of the unit can then take place to release the assembly.

The holding device 1, comprised of the lower part 4, the intermediate part 5 and the upper part 6, holds tubular elements 9 and 10, (which may be of different diameter) in a noise-damped condition while the whole arrangement is fastened firmly to a support. This holding device is especially useful, therefore, in the field of motor vehicle technology, where, on the one hand, a very good noise damping is desired but, on the other hand, a very good holding effect must be obtained. Since the intermediate part 5 and the upper part 6 are engaged, in each case, through catch projections entering in corresponding openings of the lower part 4, these parts are ideally secured together. From FIG. 5 it appears that the bevels 48 of the upper part 6 lie against a surrounding ridge 49 of the lower part 4, so that the upper part 6 is fastened, secured and supported, to the lower part 4.

The invention has been described with reference to a preferred embodiment. Obviously, modifications and alterations will occur to others upon reading and understanding this specification. It is intended to include such modifications and alterations as part of the invention insofar as they come within the scope of the appended claims.

It is now claimed:

1. A holding device formed of plastic comprising a lower plastic component mounted to a support; an intermediate plastic component received in said lower component; an upper plastic component including catch members locked with the lower component; said lower component and said upper component formed of a relatively hard material and the intermediate component being formed as a independent component from a relatively softer material, with the holding device having at least one bearing zone for the holding of a tubular element; the bearing zone for holding a tubular element being arranged in the intermediate component and including resilient enclosing means in the mounted condition for surrounding the tubular element over substantially its entire circumference to prevent contact between the tubular element and the upper and lower components;

the lower component having lateral side walls and end walls enclosing said intermediate component, first and second catch receiving openings formed through said lateral side walls, said intermediate component having a first resilient catch projection which extends outwardly into said first catch receiving opening and said upper component having a first resilient catch projection which extends inwardly into said second catch receiving opening; and, the resilient enclosing means of the intermediate component including a flexible tongue for covering over the tubular element when the intermediate component is in the mounted condition.

2. A holding device according to claim 1 wherein the tongue (19, 20) is provided with an opening (21, 22) extending therethrough.

3. A holding device according to claim 1 wherein the intermediate component (5) has at least one bearing zone for holding of a tubular element (7, 8) on each side of a middle zone (23), and wherein the middle zone (23) includes the first catch projection (13) and a cylindrical opening (24).

4. A holding device according to claim 3 wherein the bearing zones (7, 8) of the intermediate component (5) have at least one groove (45, 46) lying opposite the tongue (19, 20).

5. A holding device according to claim 3 wherein the bearing zones (7, 8) of the intermediate component are designed to receive tubular elements (9, 10) of different diameter.

6. A holding device according to claim 1 wherein the lower component (4) is U-shaped in cross section with a bottom wall (25) joining said side walls (26, 26') with entry openings (27, 28) formed in said side walls at locations corresponding to the bearing zones (7, 8) of the intermediate component (5) for receiving tubular elements to be mounted by the holding device.

7. A holding device according to claim 6 wherein the entry openings (27, 28) are provided with chamfered lead-in slopes (29) and bevels (30) for facilitating the premounting of the tubular members (9, 10).

8. A holding device according to claim 6 wherein the bottom wall (25) of the lower component (4) has a middle zone (23) carrying retaining means for fastening to a support carried fastening element.

9. A holding device according to claim 8, wherein said retaining means comprises at least two resilient fingers (31), lying opposite each other, and provided with stepped graduations (32).

10. A holding device according to claim 1 wherein the upper component (6) comprises a plate (35) and two laterally side walls (36, 37) lying opposite each other and carrying the second catch projection (16).

11. A holding device according to claim 3 wherein the upper component (6) has a bolt-like member (38) provided with a blind hold (40) and connected through a membrane (39) with the upper component.

12. Holding device according to claim 11 wherein the bolt-like member (38) has a head (41) with tool engagement surfaces and a blind hole (40).

* * * * *